(12) United States Patent
Gusler et al.

(10) Patent No.: US 8,307,026 B2
(45) Date of Patent: Nov. 6, 2012

(54) ON-DEMAND PEER-TO-PEER STORAGE VIRTUALIZATION INFRASTRUCTURE

(75) Inventors: Carl Phillip Gusler, Austin, TX (US); Rick Allen Hamilton, II, Charlottesville, VA (US); James Wesley Seaman, Falls Church, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 12/175,289

(22) Filed: Jul. 17, 2008

(65) Prior Publication Data

US 2010/0017456 A1    Jan. 21, 2010

Related U.S. Application Data

(63) Continuation of application No. 10/922,281, filed on Aug. 19, 2004, now Pat. No. 7,499,980.

(51) Int. Cl.
*G06F 15/16* (2006.01)

(52) U.S. Cl. ........................................... 709/200
(58) Field of Classification Search .................... 709/200
See application file for complete search history.

(56) References Cited

U.S. PATENT DOCUMENTS

| | | | |
|---|---|---|---|
| 5,559,960 A * | 9/1996 | Lettvin | 726/24 |
| 5,909,540 A * | 6/1999 | Carter et al. | 714/4.4 |
| 5,987,506 A * | 11/1999 | Carter et al. | 709/213 |
| 6,173,374 B1 * | 1/2001 | Heil et al. | 711/148 |
| 6,202,100 B1 | 3/2001 | Maltby et al. | |
| 6,368,790 B1 | 4/2002 | Scott | 435/6 |
| 6,438,642 B1 * | 8/2002 | Shaath | 711/100 |
| 6,587,467 B1 | 7/2003 | Morgenstern et al. | 370/399 |
| 6,654,831 B1 * | 11/2003 | Otterness et al. | 710/74 |
| 6,658,663 B1 * | 12/2003 | Bruynsteen | 725/134 |
| 6,910,064 B1 * | 6/2005 | Astarabadi et al. | 709/203 |
| 6,915,403 B2 | 7/2005 | Yamamoto et al. | |
| 6,938,042 B2 * | 8/2005 | Aboulhosn et al. | 1/1 |
| 6,959,265 B1 | 10/2005 | Candela et al. | |

(Continued)

FOREIGN PATENT DOCUMENTS

JP    2003067276    3/2003

(Continued)

OTHER PUBLICATIONS

Cox, Landon et al. Samsara: Honor Among Thieves in Peer-to-Peer Storage. Oct. 2003. ACM. pp. 1-13.*

(Continued)

*Primary Examiner* — Imad Hussain
(74) *Attorney, Agent, or Firm* — Yee & Associates, P.C.; Mark C. Vallone

(57) ABSTRACT

An on-demand virtual drive from dedicated storage on a plurality of partners in a peer-to-peer network uses an agent installed on each of the partners. The agent has a contributing program and a requesting program. The contributing program creates a first storage unit and a second storage unit, formatting the second storage unit so that it is not visible to the operating system of the partner and transmitting the size of the second storage unit to the other partners. The requesting partner creates a virtual drive using space on selected partner's second drives, and directs data blocks in and out of the virtual drive. A rules engine incorporating RAID algorithms governs the selection of the partners and allocation of available space.

20 Claims, 4 Drawing Sheets

U.S. PATENT DOCUMENTS

| | | | |
|---|---|---|---|
| 7,043,637 B2 | 5/2006 | Bolosky et al. | |
| 7,069,295 B2* | 6/2006 | Sutherland et al. | 709/203 |
| 7,072,994 B2 | 7/2006 | Britton | |
| 7,085,835 B2 | 8/2006 | Bantz et al. | |
| 7,133,368 B2 | 11/2006 | Zhang et al. | |
| 7,136,981 B2 | 11/2006 | Burch, Jr. et al. | |
| 7,139,809 B2 | 11/2006 | Husain et al. | |
| 7,181,536 B2 | 2/2007 | Burbeck et al. | |
| 7,194,532 B2 | 3/2007 | Sazawa et al. | |
| 7,194,656 B2 | 3/2007 | Hayward | |
| 7,231,463 B2 | 6/2007 | Nagendra et al. | |
| 7,379,990 B2 | 5/2008 | Tsao | |
| 7,383,410 B2 | 6/2008 | Dalal et al. | |
| 7,409,521 B2 | 8/2008 | Umeda | |
| 7,480,912 B2 | 1/2009 | Arnold et al. | |
| 7,499,980 B2 | 3/2009 | Gusler et al. | |
| 7,523,273 B2 | 4/2009 | Gusler et al. | |
| 7,577,729 B1* | 8/2009 | Umbehocker et al. | 709/223 |
| 7,613,945 B2 | 11/2009 | Soran et al. | |
| 7,680,738 B2 | 3/2010 | Amann et al. | |
| 7,870,218 B2 | 1/2011 | Dubnicki et al. | |
| 7,975,072 B2 | 7/2011 | Canova, Jr. et al. | |
| 7,984,251 B2 | 7/2011 | Gusler et al. | |
| 2002/0007350 A1 | 1/2002 | Yen | |
| 2002/0035080 A1 | 3/2002 | Scott | 514/44 |
| 2002/0062285 A1 | 5/2002 | Amann et al. | 705/43 |
| 2002/0103889 A1* | 8/2002 | Markson et al. | 709/223 |
| 2002/0103969 A1 | 8/2002 | Koizumi et al. | |
| 2002/0144076 A1 | 10/2002 | Yamamoto et al. | |
| 2002/0162109 A1* | 10/2002 | Shteyn | 725/87 |
| 2002/0169877 A1* | 11/2002 | Bantz et al. | 709/226 |
| 2002/0194209 A1* | 12/2002 | Bolosky et al. | 707/205 |
| 2003/0009586 A1* | 1/2003 | Harrow et al. | 709/238 |
| 2003/0031176 A1* | 2/2003 | Sim | 370/392 |
| 2003/0051117 A1* | 3/2003 | Burch et al. | 711/173 |
| 2003/0105829 A1* | 6/2003 | Hayward | 709/214 |
| 2003/0110263 A1* | 6/2003 | Shillo | 709/226 |
| 2003/0120751 A1* | 6/2003 | Husain et al. | 709/219 |
| 2003/0131044 A1 | 7/2003 | Nagendra et al. | |
| 2003/0149750 A1* | 8/2003 | Franzenburg | 709/220 |
| 2003/0152034 A1 | 8/2003 | Zhang et al. | |
| 2003/0158958 A1 | 8/2003 | Chiu | |
| 2003/0177266 A1* | 9/2003 | Britton | 709/245 |
| 2003/0182428 A1 | 9/2003 | Li et al. | |
| 2003/0187918 A1* | 10/2003 | Burbeck et al. | 709/203 |
| 2003/0212571 A1* | 11/2003 | Sazawa et al. | 705/1 |
| 2004/0120225 A1* | 6/2004 | Dalal et al. | 369/30.04 |
| 2004/0158687 A1* | 8/2004 | Yang | 711/162 |
| 2004/0199566 A1 | 10/2004 | Carlson et al. | |
| 2004/0215622 A1* | 10/2004 | Dubnicki et al. | 707/10 |
| 2004/0215749 A1* | 10/2004 | Tsao | 709/220 |
| 2004/0243692 A1 | 12/2004 | Arnold et al. | |
| 2005/0044246 A1* | 2/2005 | Kawabata et al. | 709/229 |
| 2005/0055603 A1* | 3/2005 | Soran et al. | 714/7 |
| 2005/0071596 A1* | 3/2005 | Aschoff et al. | 711/170 |
| 2006/0020664 A1* | 1/2006 | Umeda | 709/203 |
| 2006/0041527 A1* | 2/2006 | Fessler | 707/1 |
| 2006/0041619 A1* | 2/2006 | Gusler et al. | 709/205 |
| 2006/0236061 A1 | 10/2006 | Koclanes | |
| 2009/0077317 A1* | 3/2009 | Kavuri et al. | 711/117 |
| 2009/0276494 A1* | 11/2009 | Canova et al. | 709/205 |
| 2010/0017456 A1 | 1/2010 | Gusler et al. | |

FOREIGN PATENT DOCUMENTS

| | | |
|---|---|---|
| WO | 00/41510 A2 | 1/2000 |
| WO | 01/61495 A1 | 8/2001 |
| WO | 02/058453 | 8/2002 |
| WO | 02/089488 | 11/2002 |
| WO | 03/023641 | 3/2003 |
| WO | 03/041397 A1 | 5/2003 |
| WO | 03/075168 | 12/2003 |

OTHER PUBLICATIONS

Dingledine, Roger et al. The Free Haven Project: Distributed Anonymous Storage Service. Dec. 17, 2000. pp. 1-23.*

Muthitacharoen, Athicha et al. Ivy: A Read/Write Peer-to-Peer File System. Dec. 2002. USENIX Association. pp. 1-14.*

Author Unknown, "Virtual Storage Architecture White Paper," Storage Computer, at http://storage.tracent.net/cgi-bin/articles/view.asp?id=142 (last visited Jul. 9, 2004).

Morris & Truskowski, "The Evolution of Storage Systems," IBM Systems Journal, 2003, vol. 42, No. 2 pp. 205-217.

Birman & Ritsko, "Preface," IBM Systems Journal, 2003, vol. 42, No. 2, pp. 203-204.

Azagury, Factor & Micka, "Advanced Functions for Storage Subsystems: Supporting Continuous Availability," IBM Systems Journal, 2003, vol. 42, No. 2, pp. 268-279.

Kaczmarski, Jiang & Pease, "Beyond Backup Toward Storage Management," IBM Systems Journal, 2003, vol. 42, No. 2, pp. 322-336.

Green, Chappuis, Fisher, Frosch & Wood, A Perspective on Advanced Peer-Peer Networking, IBM Systems Journal, 2003, vol. 26, No. 4, pp. 414-428.

USPTO office action for U.S. Appl. No. 12/419,096 dated Jun. 21, 2010.

USPTO notice of allowance for U.S. Appl. No. 12/419,096 dated Dec. 13, 2010.

USPTO notice of allowance for U.S. Appl. No. 10/922,281 dated Oct. 21, 2008.

Cox et al, "Samsara: Honor Among Thieves in Peer-to-Peer Storage", Oct. 2003, ACM, pp. 1-13.

Dingledine et al., "The Free Haven Project: Distributed Anonymous Storage Service", Dec. 17, 2000, pp. 1-23.

Muthitacharoen et al., "Ivy: A Read Write Peer-to-Peer File System", Dec. 2002, USENIX Association, pp. 1-14.

USPTO notice of allowance for U.S. Appl. No. 11/122,623 dated Dec. 8, 2008.

USPTO final office action for U.S. Appl. No. 11/122,623 dated Sep. 11, 2008.

Adya et al., "FARSITE: Federated, Available, and Reliable Storage for an Incompletely Trusted Environment," In: 5th Symposium on Operating Systems Design and Implementation, OSDI2002, Boston, MA, Dec. 2002, 14 pages.

Ho et al., "Single I/O Space for Scalable Cluster Computing," In: IWCC'99 Proceedings of the First IEEE Computer Society International Workshop and Computer Engineering, 1999, 9 pages.

Javidan et al., "vanDisk: An Exploration in Peer-to-Peer Collaborative Back-up Storage," In: 20th IEEE Canadian Conference on Electrical and Computer Engineering, Vancouver, BC, Apr. 2007, 4 pages.

"SANSymphony Open Storage Networking Platform," http://www.datacore.com/flash/manage.html (Flash Presentation), (last visted Apr. 22, 2005).

USPTO Notice of Allowance regarding U.S. Appl. No. 12/419,096, dated Oct. 6, 2010.

USPTO Notice of Allowance regarding U.S. Appl. No. 12/419,096, dated Mar. 16, 2011.

USPTO Office Action regarding U.S. Appl. No. 10/922,281, dated Apr. 29, 2008.

USPTO Response to Office Action regarding U.S. Appl. No. 10/922,281, dated Jul. 29, 2008.

USPTO Office Action regarding U.S. Appl. No. 11/122,623, dated Apr. 30, 2007.

USPTO Final Office Action regarding U.S. Appl. No. 11/122,623, dated Oct. 26, 2007.

USPTO Office Action regarding U.S. Appl. No. 11/122,623, dated Apr. 11, 2008.

* cited by examiner

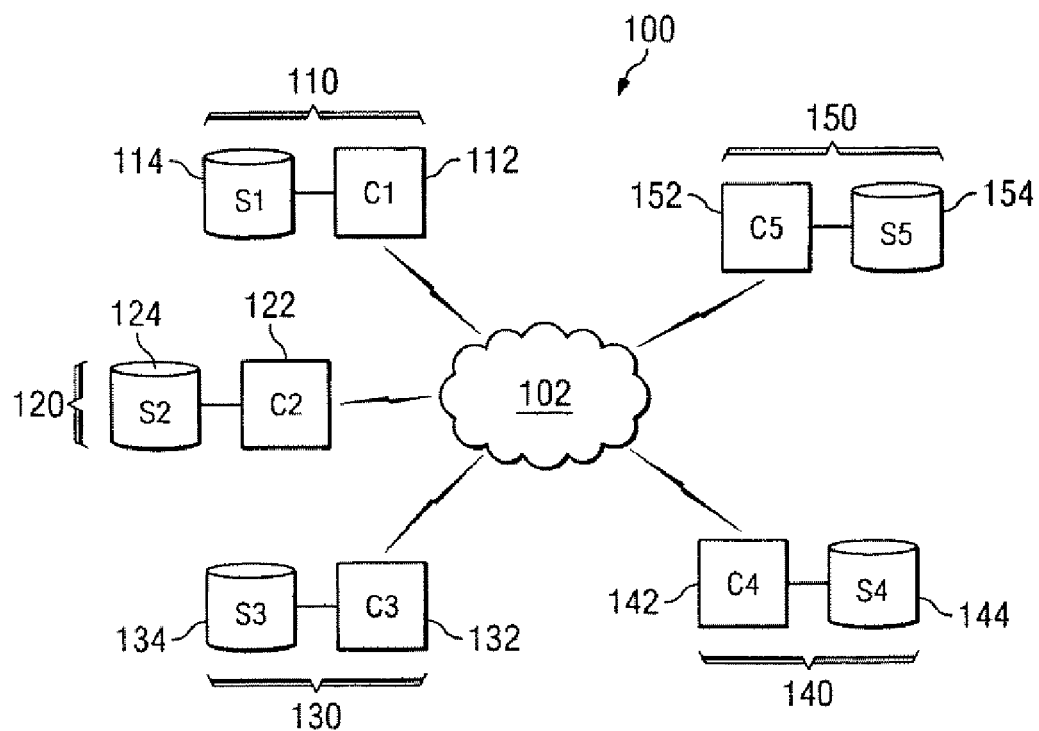
FIG. 1
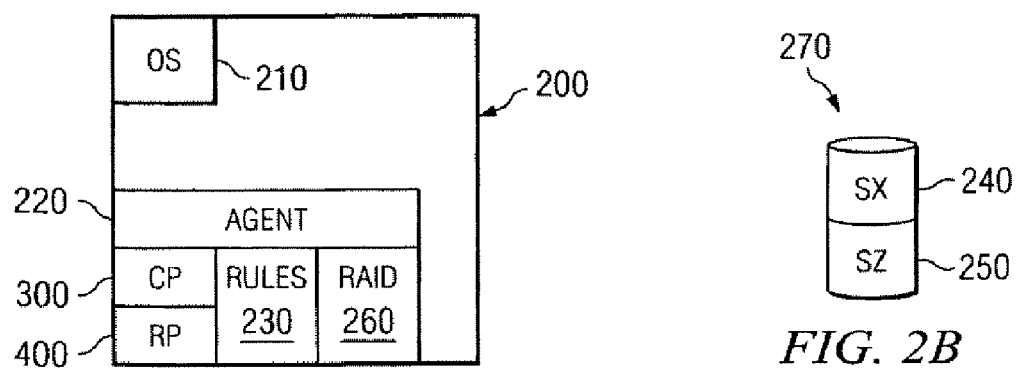
FIG. 2A
FIG. 2B

ON-DEMAND PEER-TO-PEER STORAGE VIRTUALIZATION INFRASTRUCTURE

CROSS-REFERENCE TO RELATED APPLICATION(S)

This application is a continuation of application Ser. No. 10/922,281 entitled "System and Method for an On-Demand Peer-To-Peer Storage Virtualization Infrastructure" filed on Aug. 19, 2004 now U.S. Pat. No. 7,499,980, status allowed.

FIELD OF THE INVENTION

The present invention relates generally to a system for managing files in electrical computers or digital processing systems. In particular, the invention is directed to a process for managing files across multiple memories connected via one or more communications media.

BACKGROUND OF THE INVENTION

Many computer-related applications require large amounts of storage capacity. These applications often require more storage space than is available on a single computer. Applications such as mail servers, local mail replicas, workgroup data, and large databases require huge investments in storage capacity. In addition, file duplication further increases demands for storage capacity.

Almost all computers in a network have some unused storage space, but a typical user cannot access this unused storage space readily. Much of the untapped storage space available on a network is on computers primarily intended for stand alone use by an individual. These computers may not be online when needed. Even if one user in a network could access the untapped storage space on a second user's computer, such space would be available as individual storage units, rather than as one large unit. The space available on an individual unit may not be adequate for the storage of large files or data structures.

A need exists to identify untapped storage space in a network and to make the untapped storage space available as one unit. Applications that could take advantage of such a system include file level backup and recovery, archival of electronic mail replicas, and archival of static data.

Data can be stored in any device capable of retaining the data and from which the data can be retrieved. A storage device whose contents are lost when power is cut off provides volatile storage. A storage device whose contents are not lost when power is cut off provides non-volatile storage.

The terms storage and memory are sometimes used loosely as synonyms. In a more precise and useful sense, the term memory pertains to the part of storage in which instructions are executed and excludes auxiliary storage devices such as disks, diskettes, mass storage devices and magnetic tape. The term memory is used primarily for volatile storage in electronic solid state components whereas the term storage is used primarily for storage in magnetic and optical media.

A hard disk means a rigid magnetic disk such as the internal disks used in the system units of personal computers and in external hard disk drives. The term hard disk is also used loosely in the industry for boards and cartridges containing microchips or bubble memory that simulate the operations of a hard disk drive. A hard disk drive means a stand alone disk drive that reads and writes data on rigid disks and can be attached to a port on the system unit.

Engineers build storage systems by taking a storage device, such as a hard disk drive, and adding layers of hardware and software in order to create a highly reliable system. Storage systems include Direct Attached Storage (DAS) and Network Attached Storage (NAS). In "The Evolution of Storage Systems" *IBM Systems Journal*, Vol. 42, No. 2, 2003, the authors, R. J. T. Morris and B. J. Truskowski, describe how the emergence of low-cost local area data networking has allowed the development of Network-Attached Storage (NAS) and storage area network (SAN) technologies. The authors further describe how block virtualization and SAN file systems are necessary to fully reap the benefits of these technologies.

Client server networks allow distributed data processing where a program on one computer sends a request to a program at another computer and awaits a response. The requesting program is called a client, and the answering program is called a server. Client server networks can share physical storage space; however, the use of the shared space is limited by the availability of the server.

An architecture that avoids dependency on a single server is peer-to-peer, commonly known as P2P. A peer-to-peer network has two or more computers that communicate and share data where each computer uses the same program or type of program. Peer-to-peer networks allow the sharing of resources, including storage, among the members of the network without dependency on a single server. A peer-to-peer network is not dependent on a single server because each computer has the same capabilities as the other computers. Therefore, unlike a client-server network, the computers in a peer-to-peer network can each assume the role of a server computer or a client computer to any of the other computers.

International Business Machine Corporation's Advanced Peer-to-Peer Networking (APPN) is an example of a product that supports peer-to-peer communication and resource sharing. APPN is a group of protocols enabling program-to-program communication within IBM Systems Network Architecture (SNA) network. APPN is an extension to SNA that includes greater distributed network control that isolates the effects of single points of failure, dynamic topology information, dynamic definition of network resources, and automated resource registration and directory lookup.

While a peer-to-peer network avoids dependency on a single server, and allows sharing of physical storage space among the computers in the network, a problem arises when one of the computers having shared storage space goes off line. Therefore, shared distributed physical storage space requires planning for a method to deal with a loss of a portion of the shared space should one or more of the contributing computers go off line.

Methods to deal with a loss of a storage space using redundancy are known. Redundancy can be built into a computer storage system through specialized algorithms that store data in an array of independent disks. For example, Redundant Array of Independent Disks (RAID), the most common algorithm for storing data in a disk drive, maps multiple disk drives into a large, single drive. A RAID drive generally appears as a single disk drive to a user, but files stored in a RAID drive may actually span multiple disks. RAID systems protect data from disk failure by storing data redundantly on disks within the array.

RAID distributes data, along with information used for error correction, among two or more hard disks in order to improve performance and reliability. Parity is an error checking procedure in which the number of 1 s must always be the same—either even or odd—for each group of bits transmitted without error. A parity bit is an extra bit used in checking for errors in groups of data bits transferred within or between computer systems. With personal computers, the term is frequently encountered in modem-to-modem communications, in which parity bit is often used to check the accuracy with which each character is transmitted, and in RAM, where a parity bit is often used to check the accuracy with which each byte is stored. The hard disk array is governed by array management software and a disk controller, which handles the error correction.

Different RAID algorithms provide for various degrees of data redundancy and fault tolerance. For example, RAID-1 maintains a "mirror image" of a disk, but requires a second disk on which to store the mirror image. In theory, the data on the mirror image is always available if the original disk fails or is otherwise unavailable. Additionally, RAID-1 allows a computer to read both disks simultaneously, which effectively doubles the data transfer rate. Thus, RAID-1 is a simple system that provides substantial benefits, but at twice the cost. A RAID-3 configuration stores data on several drives by combining a set of same-size disk partitions on separate disks into a single logical volume that an operating system can recognize as a single drive, a process referred to as "striping." In addition to storing data on several drives, parity is stored on one drive. A RAID-5 configuration uses striping to place data at block level across several drives and also distributes the parity data on the several drives. A RAID-6 configuration dedicates one drive to storing parity data. Each disk drive in a RAID-6 configuration also contains parity data for itself. A RAID 10 configuration, which may be also referred to as RAID 0+1, uses striping to place data on several drives, and makes a copy of the striped drives for redundancy. The mirroring of the disks in RAID 10 eliminates the need for parity.

International Publication WO 02/089488 entitled "P2P Network Architecture for Distributed Storage" (the '488 publication) discloses the use of distributed mass storage devices, such as hard disk drives, that are partitioned to prevent direct manipulation of the data by the user. A given video program may be stored in segments on various set top boxes, and data is transferred through a router under the control of a head-end control system. Therefore, in the '488 publication, a system is disclosed where a program on a computer may determine where the computer's data resides, and may also contain data that is stored on the computer that is not managed by that computer. Specifically, the '488 publication discloses a peer-to-peer environment where multiple peers may affect the availability and access of content in the peer-to-peer network.

What is needed beyond the prior art is a method for using the unused storage capacity within an enterprise that capitalizes on existing peer-to-peer architecture capabilities and existing RAID technology. A further need exists for a system and method to take advantage of the unused space on network-attached personal computers, notebook computers, and servers by allowing any computer in the system to request access to the unused space, and to control other computers in allocating the space. Additionally, a need exists for a redundant system to use such unused space to account for periodic non-availability of a contributing computer.

SUMMARY OF THE INVENTION

The invention that meets the needs stated above is a system and method for creating an on-demand virtual drive from dedicated storage on a plurality of partners in a peer-to-peer network using an agent installed on each of the partners. Each of the partners is connected by a network and has a computer containing an operating system and an agent. The agent has a contributing program and a requesting program. The contributing program identifies available physical storage space for the partner and divides the available storage space into a first storage unit and a second storage unit. The contributing program formats the second storage unit so that it is not visible to the operating system of the partner. The contributing program transmits the size of the second storage unit to the other partners. The contributing program listens for a request for storage from a requesting partner, and receives instructions from the requesting partner to allocate space in the second storage unit. The requesting program, at the requesting partner, scans the other partners and applies rules for selecting partners and allocating available space. The requesting partner sends instruction to the selected partners to format the selected partners' second storage unit. The requesting partner creates a virtual drive using space on the selected partner's second storage units, and directs data blocks in and out of the virtual drive. A rules engine governs the selection of the partners and allocation of those partners' available space. RAID algorithms may be integrated into the instructions to provide redundancy in case of unforeseen or periodic non-availability.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 illustrates a peer-to-peer network of partners;
FIG. 2 represents a partner memory.

DETAILED DESCRIPTION OF THE PREFERRED EMBODIMENT

Figure 3:
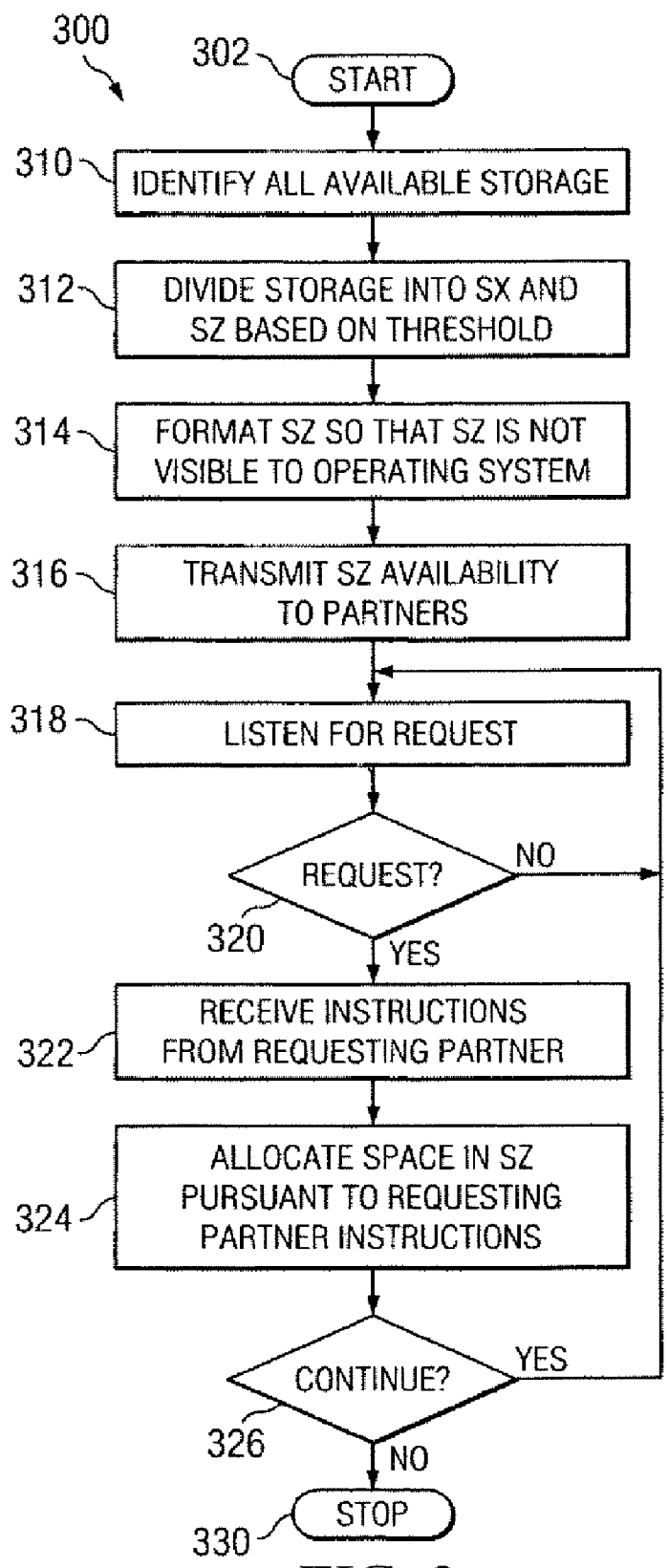
FIG. 3 is a flow chart of the agent contributing program.

A person of ordinary skill in the art will appreciate that the present invention may be implemented in a variety of software and hardware configurations. It is believed, however, that the invention is described best as a computer program that configures and enables general-purpose computers to implement the novel aspects of the invention within a peer-to-peer network.

As used herein, an "agent" is any program operable on a partner that segregates a portion of the storage unit of the computer in which the agent is installed so that it is available for incorporation into a virtual memory, and enables the partner to communicate and share data with other partners.

As used herein, "computer" means a machine having a processor, a memory, and an operating system, capable of interaction with a user, another computer, a network, or a storage unit, and shall include without limitation desktop computers, notebook computers, tablet computers, personal digital assistants (PDAs), servers, handheld computers, and similar devices.

As used herein, a "contributing program" is an agent that automatically segregates a portion of the storage unit, of the computer in which the agent is installed, for allocation to a virtual drive.

As used herein, "data block" means a string of data elements recorded or transmitted as a unit.

As used herein, "data element" means an indivisible unit of data.

As used herein, "parallel" means that block level upload or download to the contributing computers takes place at the same time, and the blocks are reassembled or disassembled at the requesting computer according to the RAID algorithm employed.

As used herein, Redundant Array of Independent Disk Drives (RAID) algorithms means instructions for data storage in which data and error correction information is distributed among two or more hard disks in a hard disk array governed by array management software and a disk controller that handles the error correction.

As used herein, a "requesting program" is an agent that, responsive to a demand for storage by requesting partner, creates a virtual drive for the requesting partner by scanning the network, issuing instructions responsive to a rules engine, and optionally integrating RAID algorithms into the instructions.

As used herein, "peer-to-peer architecture" means a network of computers wherein each computer is able to directly communicate and share data with the other computers.

As used herein, "partner" means a computer connected to one or more other computers in a peer-to-peer architecture.

As used herein, the term "storage unit" means all of the addressable storage space available to a partner including Directly Attached Storage (DAS) and Network Attached Storage (NAS).

FIG. 1 illustrates a prior art architecture for connecting various hardware devices to create a peer-to-peer network for transferring data between partners. Network 100 is a peer-to-peer network and has first partner 110, second partner 120, third partner 130, fourth partner 140, and fifth partner 150 electrically coupled to network connection 102. First partner 110 comprises computer C1 112 and storage unit S1 114. Second partner 120 comprises computer C2 122 and storage unit S2 124. Third partner 130 comprises computer C3 132 and storage unit S3 134. Fourth partner 140 comprises computer C4 142 and storage unit S4 144. Fifth partner 150 comprises computer C5 152 and storage unit S5 154. Network connection 102 may be a simple local area network (LAN) or may be a larger wide area network (WAN), such as the Internet. In the preferred embodiment, the network is a Transmission Control Protocol/Internet Protocol (TCP/IP) based network. While network 100 depicted in FIG. 1 is intended to represent a possible network architecture, it is not intended to represent an architectural limitation, and such a network may consist of any number of partners and partner configurations.

The internal configuration of a computer, including connection and orientation of the processor, memory, and input/output devices, is well known in the art. FIG. 2A represents the internal configuration of a partner computer having the computer program of the present invention loaded into partner memory 200. Partner memory 200 contains operating system (OS) 210, agent 220, contributing program (CP) 300, requesting program (RP) 400, rules engine 230, and RAID algorithms 260. Agent 220, when installed in memory 200, enables a computer in the network that is connected to the memory to communicate directly and share data with each of the other computers in the network and enables the computer to act as a server to any other computer in the network, and enables the computer to act as a requesting computer or as a contributing computer. Persons skilled in the art are aware that agent 220, CP 300 and RP 400 may be separate and cooperating programs, or CP 300 and RP 400 may be integrated into agent 220.

Referring to FIG. 2B, available storage space 270 is shown divided into first storage unit (SX) 240 and second storage unit (SZ) 250. CP 300, when installed in memory 200, enables a computer connected to storage space 270 to search partner storage space 270 for all available physical storage space and to determine the amount of space in storage space 270 to set aside for space sharing. The amount of space to be set aside for space sharing will be determined by a threshold value either input into CP 300 or programmed as a default value. For example if storage space 270 had 40 GB of space available, and the threshold value is set at fifty percent (50%), then CP 300 would allocate 20 GB to SX 240 and 20 GB to SZ 250. As will be explained further below, SZ 250, which is the space allocated for space sharing, will be formatted so that it cannot be seen by OS 210. Memory 200 is only illustrative of memory within a partner computer and is not meant as a limitation. Storage space 270 is only illustrative of storage space available to a partner compute and is not meant as a limitation. Agent 220 is configured to enable partners to communicate through network connection 102. In the preferred embodiment, a hybrid of a RAID-6 algorithm is used. Parity storage space would be allocated in addition to the data storage space on a contributing computer. RAID-6 calls for a second copy of the parity data to be maintained by the requesting computer. RAID-6 would allow up to two contributing computers to be off-line and still provide access to all the data. Other RAID configurations can be incorporated such as RAID-1, RAID 3, RAID-5, and RAID-10.

FIG. 3 depicts a flow chart of contributing program (CP) 300. CP 300 begins when installed (302) and identifies all available storage in the partner computer (310). CP 300 then divides the storage into a first storage unit (SX 240 in FIG. 2) and a second storage unit (SZ 250 in FIG. 2) based upon a threshold value (312). The threshold value may be input at initialization, or it may be a default value in the CP 300 program. Next, CP 300 formats second storage unit (SZ) so that the second storage unit (SZ) is not visible to the operating system of the partner computer (OS 210 in FIG. 2). CP 300 then transmits the amount of available space in SZ to other partners in the system (316). CP 300 may transmit other availability information, such as an "availability time." The availability time may be expressed in a minimum availability time or in a maximum availability time. The availability time specifies the time that a space is available in the second storage unit, and after the available time, the space may be cleared by removing the requesting partner's data. After removing the requesting partner's data, the space may be available for further allocation in the second storage unit, or the space may be withdrawn from further availability in the second storage unit and added to the first storage unit. CP 300 then listens for requests (318). CP 300 determines whether the partner received a request (320) and if the partner did not receive a request, CP 300 continues to listen (318). If the partner received a request, CP 300 receives instructions from the requesting partner (322). CP 300 allocates space in SZ pursuant to the instructions from the requesting partner (324). CP 300 determines whether to continue (326) and if so, CP 300 goes to step 318. If not, CP 300 stops (330).

Figure 4:
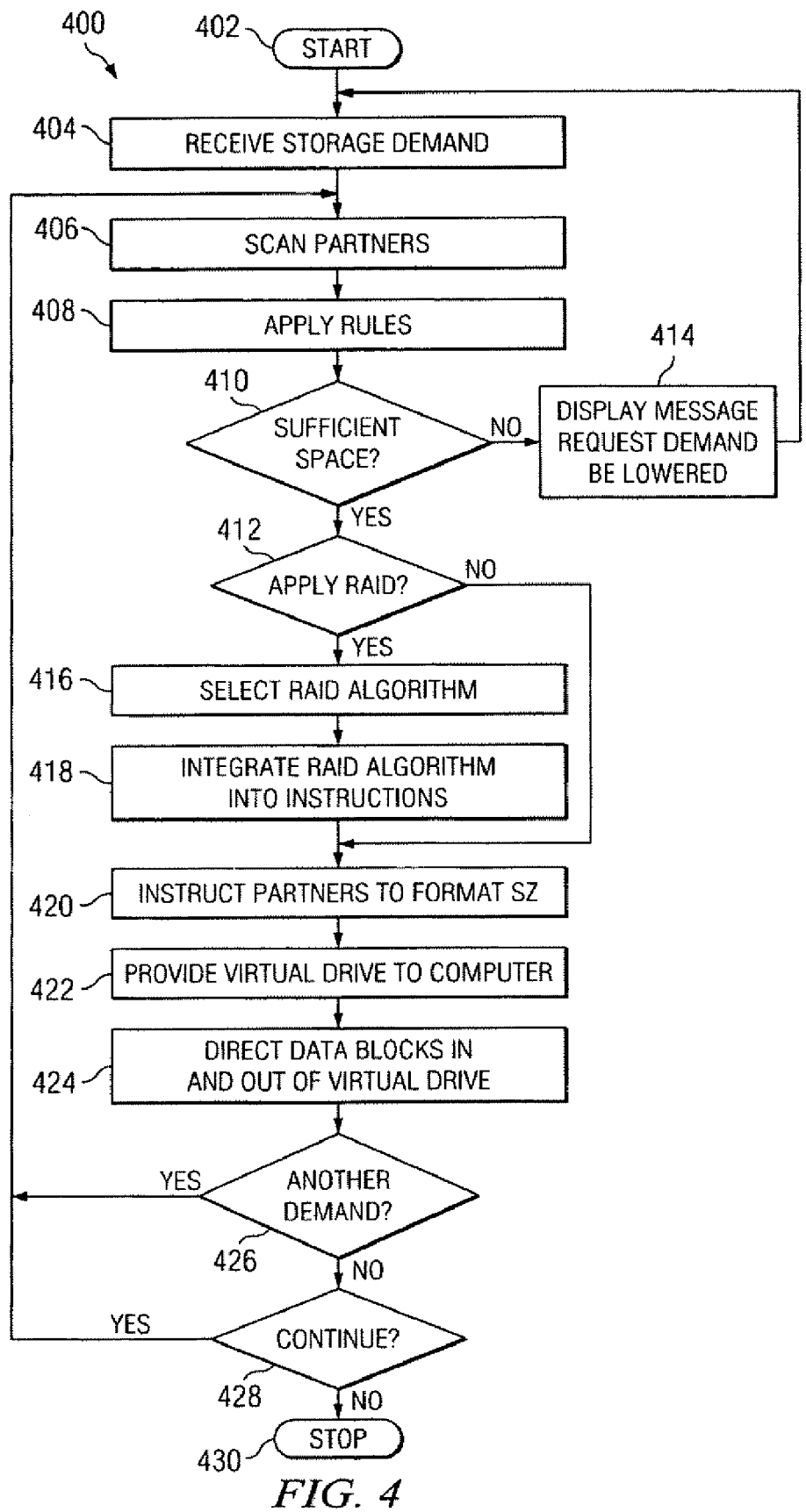
FIG. 4 is a flow chart of the agent receiving program.

FIG. 4 depicts a flow chart for requesting program (RP) 400. RP 400 starts (402) when a demand for storage has been received (404). RP 400 scans each partner, with which RP 400 is in communication, for available space (406). RP 400 uses rules from rules engine 230 (See FIG. 2) to select partners and allocate space within the selected partners SZs (408). The rules engine may use a number of different objectives and algorithms to determine which contributing partners to select given the requirements of the requesting partner. "Scarcity" rules may be used to determine the best solution where there is a scarcity of suitable responses. "Bounteous" rules may be used to determine the best solution where there is a plethora of suitable responses. Rules may also be provided to determine the optimum storage solution for the requesting partner without considering factors affecting the contributing partners, or alternatively, to determine the optimum storage solution for the requesting partner while taking into account factors affecting the contributing partner. Rules may be provided to determine storage solutions for the requesting partner while seeking to conserve network resources. A rule configuration may be simple such as a "first in first out" configuration, where a requesting partner would simply choose from the first requesters to respond, in response order. Another rule configuration may consider network topology or geographic proximity, where a requesting partner would choose from the closest contributing partners. The rules engine may also be configured to take into account other availability information provided by the contributing partners, such as a maximum availability time. RP 400 determines whether there is sufficient space to meet the demand (410). If not, RP 400 displays a message requesting the user to lower the demand (414) and RP 400 goes to step 404. If so, RP 400 determines whether or not to apply a RAID algorithm (412). If so, RP 400 selects a RAID algorithm from RAID algorithms 260 (see FIG. 2) and integrates the selected RAID algorithm into instructions to be sent to the selected partners (418). RP 400 then sends instructions to each of the selected partners to format space in its SZ (420). RP 400 then forms the formatted space from the selected partners' SZs into a virtual drive that is provided to the requesting partner's computer (422). RP 400 then directs data blocks in and out of the virtual drive (424). When a RAID algorithm is employed, data blocks are directed in parallel. A determination is made as to whether there is another demand (426). If so RP 400 goes to step 406. If not, RP 400 determines whether it is to continue (428). If so, RP 400 goes to step 406. If not, RP 400 ends (430).

Figure 5:
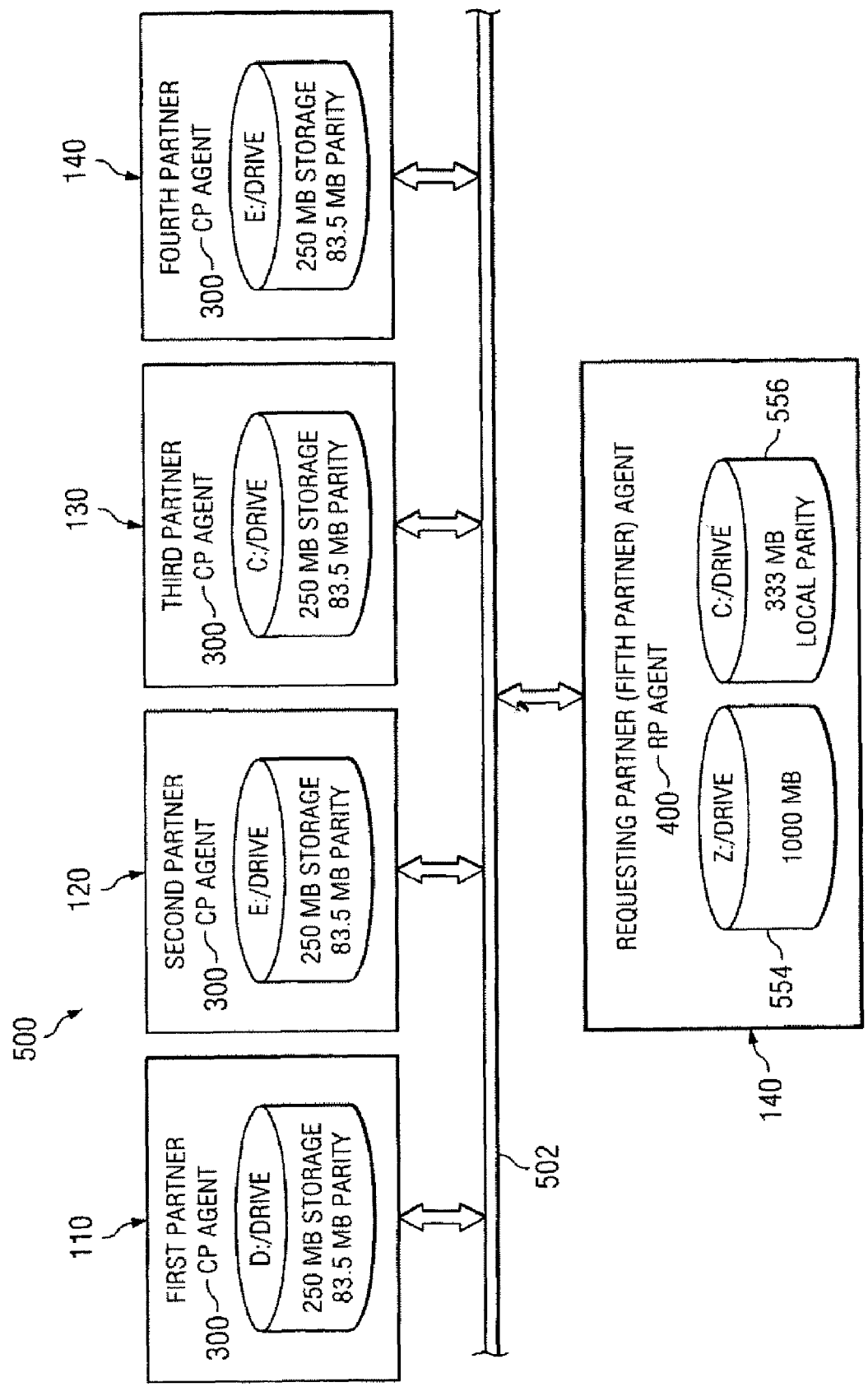
FIG. 5 depicts an example of space allocation on partner computers.

FIG. 5 depicts an example of implementation of CP 300 and RP 400 incorporating a RAID 6 algorithm. First partner 110, second partner 120, third partner 130, and fourth partner 140 each have a CP 300 that, responsive to instructions from RP 400 in fifth partner 140, allocates 250 MB of storage space to each of the four contributing partner's SZ and also allocates an additional 83.25 MB of storage space in each of the four contributing partner's SZ for parity information. The 250 MB contribution by each of the partners provides a total of 1000 MB of new storage space available to the requesting partner as Z drive 554, which will be managed as a single logical drive on fifth partner 150. Fifth partner 150 is the requesting partner. Furthermore, fifth partner 150 allocates 333 MB of disk storage space on its C drive 556 for redundancy of the parity information stored on each of the partner drives. Fifth partner 150 then stores its data on Z drive 554.

In an additional embodiment, a key signature may be employed to provide a unique address for storage space and for other shared storage spaces that will not be changed and that will not be based upon an Internet Protocol address.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer system for providing on-demand distributed storage in a peer-to-peer network, the computer system comprising:

one or more processors, one or more computer-readable memories and one or more computer-readable tangible storage devices;

program instructions, stored on at least one of the one or more computer-readable tangible storage devices for execution by at least one of the one or more processors via at least one of the one or more memories, to communicate and share data of a first computer of a plurality of computers in the peer-to-peer network with one or more other computers of the plurality of computers in the peer-to-peer network;

program instructions, stored on at least one of the one or more computer-readable tangible storage devices for execution by at least one of the one or more processors via at least one of the one or more memories, to allocate an available storage unit on the first computer into a first storage unit and a second storage unit, wherein the first computer has an operating system;

program instructions, stored on at least one of the one or more computer-readable tangible storage devices for execution by at least one of the one or more processors via at least one of the one or more memories, to format the second storage unit so that the second storage unit is not visible to the operating system of the first computer;

program instructions, stored on at least one of the one or more computer-readable tangible storage devices for execution by at least one of the one or more processors via at least one of the one or more memories, to transmit, from the first computer to one or more other computers of the plurality of computers in the peer-to-peer network, an availability time that a first space is available in the second storage unit; and program instructions, stored on at least one of the one or more computer-readable tangible storage devices for execution by at least one of the one or more processors via at least one of the one or more memories, responsive to the availability time elapsing, to clear the first space of stored data, wherein the stored data was entered into the first space by a direct communication over the peer-to-peer network from a second computer of the plurality of computers to the first computer.

2. The computer system of claim 1 wherein the availability time further comprises a time after which the first space in the second storage unit may be withdrawn from further availability.

3. The computer system of claim 1 further comprising:

program instructions, stored on at least one of the one or more computer-readable tangible storage devices for execution by at least one of the one or more processors via at least one of the one or more memories, to listen for a demand for storage from a requesting computer of the plurality of computers;

program instructions, stored on at least one of the one or more computer-readable tangible storage devices for execution by at least one of the one or more processors via at least one of the one or more memories, to perform a scan to determine an amount of physical storage available in each of a plurality of storage units of each computer of the plurality of computers other than the requesting computer;

program instructions, stored on at least one of the one or more computer-readable tangible storage devices for execution by at least one of the one or more processors via at least one of the one or more memories, responsive to performing the scan, to select a plurality of contributing computers from the plurality of computers other than the requesting computer;

program instructions, stored on at least one of the one or more computer-readable tangible storage devices for execution by at least one of the one or more processors via at least one of the one or more memories, responsive to selecting the plurality of contributing computers, to allocate a plurality of spaces, each space of the plurality of spaces being allocated from a different contributing computer storage unit of a plurality of contributing computer storage units;

program instructions, stored on at least one of the one or more computer-readable tangible storage devices for execution by at least one of the one or more processors via at least one of the one or more memories, to create a virtual drive from the plurality of spaces; and program instructions, stored on at least one of the one or more computer-readable tangible storage devices for execution by at least one of the one or more processors via at least one of the one or more memories, to direct one or more data blocks in and out of the virtual drive.

4. The computer system of claim 3 further comprising:
program instructions, stored on at least one of the one or more computer-readable tangible storage devices for execution by at least one of the one or more processors via at least one of the one or more memories, responsive to completing the scan, to issue an instruction to the plurality of contributing computers.

5. The computer system of claim 4 wherein the instruction specifies the availability time.

6. The computer system of claim 4 wherein the instruction specifies which of the plurality of contributing computer storage units to utilize to combine space into the virtual drive.

7. The computer system of claim 4 wherein the instruction conserves network resources in selecting the plurality of contributing computers.

8. The computer system of claim 4 wherein the instruction incorporates a RAID algorithm.

9. The computer system of claim 8 wherein the RAID algorithm is RAID 1.

10. The computer system of claim 8 wherein the RAID algorithm is RAID 3.

11. The computer system of claim 8 wherein the RAID algorithm is RAID 5.

12. The of computer system claim 8 wherein the RAID algorithm is RAID 6.

13. The of computer system claim 8 wherein the RAID algorithm is RAID 10.

14. The computer system of claim 1 further comprising:
program instructions, stored on at least one of the one or more computer-readable tangible storage devices for execution by at least one of the one or more processors via at least one of the one or more memories, to determine, by a threshold value, a storage unit size.

15. A method for providing on-demand storage in a peer-to-peer network, the method comprising;
a computer of a plurality of computers in the peer-to-peer network communicating and sharing data with one or more other computers of the plurality of computers in the peer-to-peer network;
the computer allocating an available storage unit on the computer into a first storage unit and a second storage unit, wherein the computer has an operating system;
the computer formatting the second storage unit so that second storage unit is not visible to the operating system;
the computer transmitting to one or more other computers of the plurality of computers in the peer-to-peer network an availability time that a first space is available in the second storage unit; and
the computer, responsive to the availability time elapsing, clearing the first space of stored data, wherein the stored data was entered into the first space by a direct communication over the peer-to-peer network from a second computer of the plurality of computers to the computer.

16. The method of claim 15 further comprising:
the computer listening for a demand for storage from a requesting computer of the plurality of computers;
the computer performing a scan to determine an amount of physical storage available in each of a plurality of storage units of each of the plurality of computers other than the requesting computer;
the computer, responsive to performing the scan, selecting a plurality of contributing computers from the plurality of computers other than the requesting computer; and
the computer, responsive to selecting the plurality of contributing computers, allocating a plurality of spaces, each space of the plurality of spaces being allocated from a different contributing computer storage unit of a plurality of contributing computer storage units;
the computer creating a virtual drive from the plurality of spaces; and
the computer directing one or more data blocks in and out of the virtual drive.

17. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 15.

18. A computer program product comprising one or more computer-readable, tangible storage devices and computer-readable program instructions which are stored on the one or more storage devices and when executed by one or more processors, perform the method of claim 15.

19. A computer program product for providing on-demand distributed storage in a peer-to-peer network, the computer program product comprising:
one or more computer-readable tangible storage devices;
program instructions, stored on at least one of the one or more computer-readable tangible storage devices, to communicate and share data of a first computer of a plurality of computers in the peer-to-peer network with one or more other computers of the plurality of computers in the peer-to-peer network;
program instructions, stored on at least one of the one or more computer-readable tangible storage devices, to allocate a first available storage unit on the first computer into a first storage unit and a second storage unit, wherein the first computer has an operating system;
program instructions, stored on at least one of the one or more computer-readable tangible storage devices, to format the second storage unit so that second storage unit is not visible to the operating system of the first computer;
program instructions, stored on at least one of the one or more computer-readable tangible storage devices, to specify an availability time that a first space is available in the second storage unit; and
program instructions, stored on at least one of the one or more computer-readable tangible storage devices, responsive to the availability time elapsing, to clear the first space of stored data, wherein the stored data was entered into the first space by a direct communication over the peer-to-peer network from a second computer of the plurality of computers to the first computer.

20. The computer program product of claim 19 further comprising:

program instructions, stored on at least one of the one or more computer-readable tangible storage devices, to listen for a demand for storage from a requesting computer of the plurality of computers;

program instructions, stored on at least one of the one or more computer-readable tangible storage devices, to perform a scan to determine an amount of physical storage available in each of a plurality of storage units of each of the plurality of computers other than the requesting computer;

program instructions, stored on at least one of the one or more computer-readable tangible storage devices, responsive to performing the scan, to select a plurality of contributing computers from the plurality of computers other than the requesting computer;

program instructions, stored on at least one of the one or more computer-readable tangible storage devices, responsive to selecting the plurality of contributing computers, to allocate a plurality of spaces from a plurality of contributing computer storage units;

program instructions, stored on at least one of the one or more computer-readable tangible storage devices, to create a virtual drive from the plurality of spaces; and program instructions, stored on at least one of the one or more computer-readable tangible storage devices, to direct one or more data blocks in and out of the virtual drive.

\* \* \* \* \*